(12) United States Patent
Wingett et al.

(10) Patent No.: US 9,303,743 B2
(45) Date of Patent: Apr. 5, 2016

(54) BALL SCREW ACTUATOR INCLUDING AN AXIAL SOFT STOP

(71) Applicant: HONEYWELL INTERNATIONAL INC., Morristown, NJ (US)

(72) Inventors: Paul T. Wingett, Mesa, AZ (US); Steven Talbert Forrest, Phoenix, AZ (US); Steve Abel, Chandler, AZ (US); George Woessner, Phoenix, AZ (US); Casey Hanlon, Queen Creek, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 196 days.

(21) Appl. No.: 14/107,410

(22) Filed: Dec. 16, 2013

(65) Prior Publication Data

US 2015/0167799 A1 Jun. 18, 2015

(51) Int. Cl.
*F16H 25/22* (2006.01)
*F16H 25/20* (2006.01)

(52) U.S. Cl.
CPC ........ *F16H 25/2204* (2013.01); *F16H 25/2015* (2013.01); *Y10T 74/18688* (2015.01)

(58) Field of Classification Search
CPC .................... F16H 25/2015; Y10T 74/18688
USPC ........... 74/89.37, 89.34, 89.23; 192/138, 141, 192/139
See application file for complete search history.

(56) References Cited

U.S. PATENT DOCUMENTS

| | | | |
|---|---|---|---|
| 2,424,492 A | 7/1947 | Morris | |
| 2,504,018 A | 4/1950 | Gibson et al. | |
| 3,824,420 A | 7/1974 | Stegeman et al. | |
| 4,192,398 A * | 3/1980 | Hunt | B60K 26/04 123/357 |
| 4,266,437 A | 5/1981 | Obergfell | |
| 4,712,441 A | 12/1987 | Abraham | |
| 4,721,196 A * | 1/1988 | Layer | G05G 5/04 192/139 |
| 4,727,762 A | 3/1988 | Hayashi | |
| 4,867,295 A * | 9/1989 | Metcalf | G05G 5/04 192/141 |
| 5,346,045 A | 9/1994 | Bennett et al. | |
| 5,994,800 A | 11/1999 | Williams | |
| 6,668,988 B2 * | 12/2003 | Nagai | F16H 25/2015 188/318 |
| 6,761,080 B2 | 7/2004 | Lange et al. | |
| 8,006,817 B2 | 8/2011 | Hanna et al. | |
| 8,314,518 B2 | 11/2012 | Hors et al. | |
| 2009/0165581 A1 * | 7/2009 | Koyagi | F16H 25/2015 74/89.23 |
| 2010/0319472 A1 | 12/2010 | Wei et al. | |
| 2012/0247240 A1 * | 10/2012 | Kawahara | F16H 25/20 74/89.23 |
| 2013/0283947 A1 | 10/2013 | Yamada et al. | |

* cited by examiner

*Primary Examiner* — William C Joyce
*Assistant Examiner* — Randell J Krug
(74) *Attorney, Agent, or Firm* — Ingrassia Fisher & Lorenz, P.C.

(57) ABSTRACT

An actuator includes an actuator housing, a ball screw, and an axial soft stop assembly. The ball screw extends through the actuator housing and has a first end and a second end. The ball screw is coupled to receive a drive force and is configured, upon receipt of the drive force, to selectively move in a retract direction and an extend direction. The axial soft stop assembly is disposed within the actuator housing. The axial soft stop assembly is configured to be selectively engaged by the ball screw and, upon being engaged thereby, to translate, with compliance, a predetermined distance in the extend direction, and to prevent further movement of the ball screw upon translating the predetermined distance.

10 Claims, 6 Drawing Sheets

BALL SCREW ACTUATOR INCLUDING AN AXIAL SOFT STOP

STATEMENT REGARDING FEDERALLY SPONSORED RESEARCH OR DEVELOPMENT

This invention was made with Government support under Agreement No. NAS15-10000 awarded by NASA. The Government may have certain rights in this invention.

TECHNICAL FIELD

The present invention generally relates to actuators, and more particularly relates to linear, ball screw actuators that include an axial ball screw soft stop.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. Many different types of actuator configurations presently exist. One particular type of actuator is a linear electro-mechanical actuator (EMA). A typical linear EMA includes a power drive unit, an actuation member, and a translation member. The power drive unit, such as a motor, is configured to supply a drive torque to the actuation member, which in turn causes the translation member to translate.

One particular type of linear EMA is a ball screw actuator. This type of actuator includes a ball screw and a ball nut. The ball nut is mounted on, and is configured to rotate relative to, the ball screw. In some configurations, the ball screw is the actuation member, and the ball nut is the translation member. With these configurations, the power drive unit drives the ball screw, which causes the ball nut to translate. In other configurations, the ball nut is the actuation member, and the ball screw is the translation member. With these configurations, the power drive unit drives the ball nut, which causes the ball screw to translate. With either of these configurations, when the power drive unit is an electric motor, and when absolute position indication is not possible, a resolver can be used for position calculation. A short fall of this system is that absolute position can be lost during start up or after a power interruption.

Hence, there is a need for an actuator that readily allows absolute position to be determined during start up or after a power interruption. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an actuator includes an actuator housing, a ball screw, and an axial soft stop assembly. The ball screw extends through the actuator housing and has a first end and a second end. The ball screw is coupled to receive a drive force and is configured, upon receipt of the drive force, to selectively move in a retract direction and an extend direction. The axial soft stop assembly is disposed within the actuator housing. The axial soft stop assembly is configured to be selectively engaged by the ball screw and, upon being engaged thereby, to translate, with compliance, a predetermined distance in the extend direction, and to prevent further movement of the ball screw upon translating the predetermined distance.

In another embodiment, an actuator includes an actuator housing, a ball nut, a motor, a ball screw, and an axial soft stop assembly. The ball nut is rotationally mounted within the housing and is coupled to receive an input torque. The ball nut is configured, upon receipt of the input torque, to rotate and supply a drive force. The motor is mounted on the actuator housing and is coupled to the ball nut. The motor is configured to selectively supply the drive torque to the ball nut. The ball screw extends through the actuator housing and the ball nut, and has a first end and a second end. The ball screw is coupled to receive the drive force from the ball nut and is configured, upon receipt of the drive force, to selectively move in a retract direction and an extend direction. The axial soft stop assembly is disposed within the actuator housing. The axial soft stop assembly is configured to be selectively engaged by the ball screw and, upon being engaged thereby, to translate, with compliance, a predetermined distance in the extend direction, and to prevent further movement of the ball screw upon translating the predetermined distance.

In yet another embodiment, an actuator includes an actuator housing, a ball nut, a motor, a gear set, a ball screw, and an axial soft stop assembly. The ball nut is rotationally mounted within the housing and is coupled to receive an input torque. The ball nut is configured, upon receipt of the input torque, to rotate and supply a drive force. The motor is mounted on the actuator housing and is coupled to the ball nut. The motor is configured to selectively supply the drive torque to the ball nut. The gear set is coupled between the motor and the ball nut. The ball screw extends through the actuator housing and the ball nut, and has a first end and a second end. The ball screw is coupled to receive the drive force from the ball nut and is configured, upon receipt of the drive force, to selectively move in a retract direction and an extend direction. The axial soft stop assembly is disposed within the actuator housing, and is configured to be selectively engaged by the ball screw and, upon being engaged thereby, to translate, with compliance, a predetermined distance in the extend direction, and to prevent further movement of the ball screw upon translating the predetermined distance. The axial soft stop includes an axial limiter, and a spring. The axial limiter is movably disposed within the actuator housing and has an opening through which the ball screw extends. The axial limiter is configured to selectively translate between a first position and a second position. The spring is disposed within the actuator housing and engages the axial limiter. The spring supplies a bias force to the axial limiter that urges the axial limiter toward the first position.

Furthermore, other desirable features and characteristics of the actuator and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
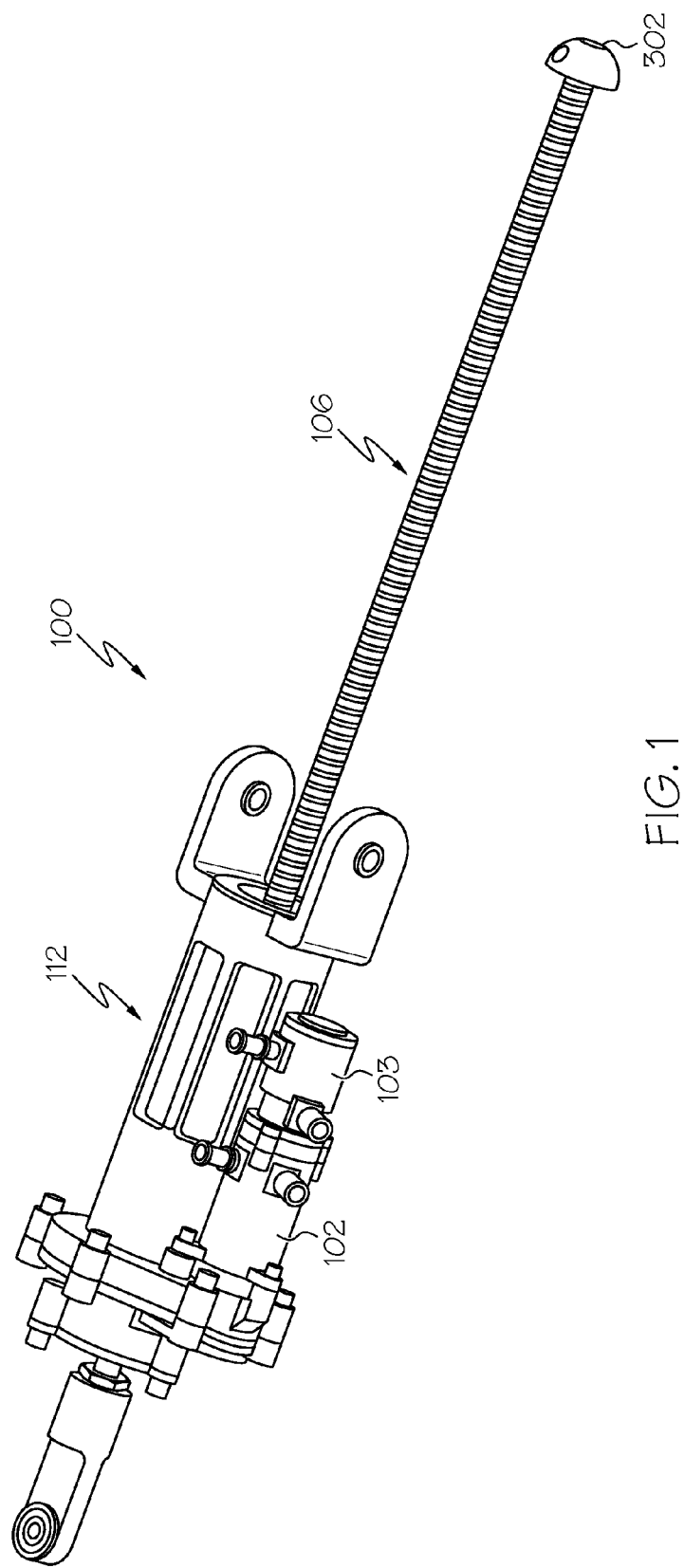
FIG. 1 depicts a plan view of one embodiment of a ball screw actuator assembly.
Figure 2:
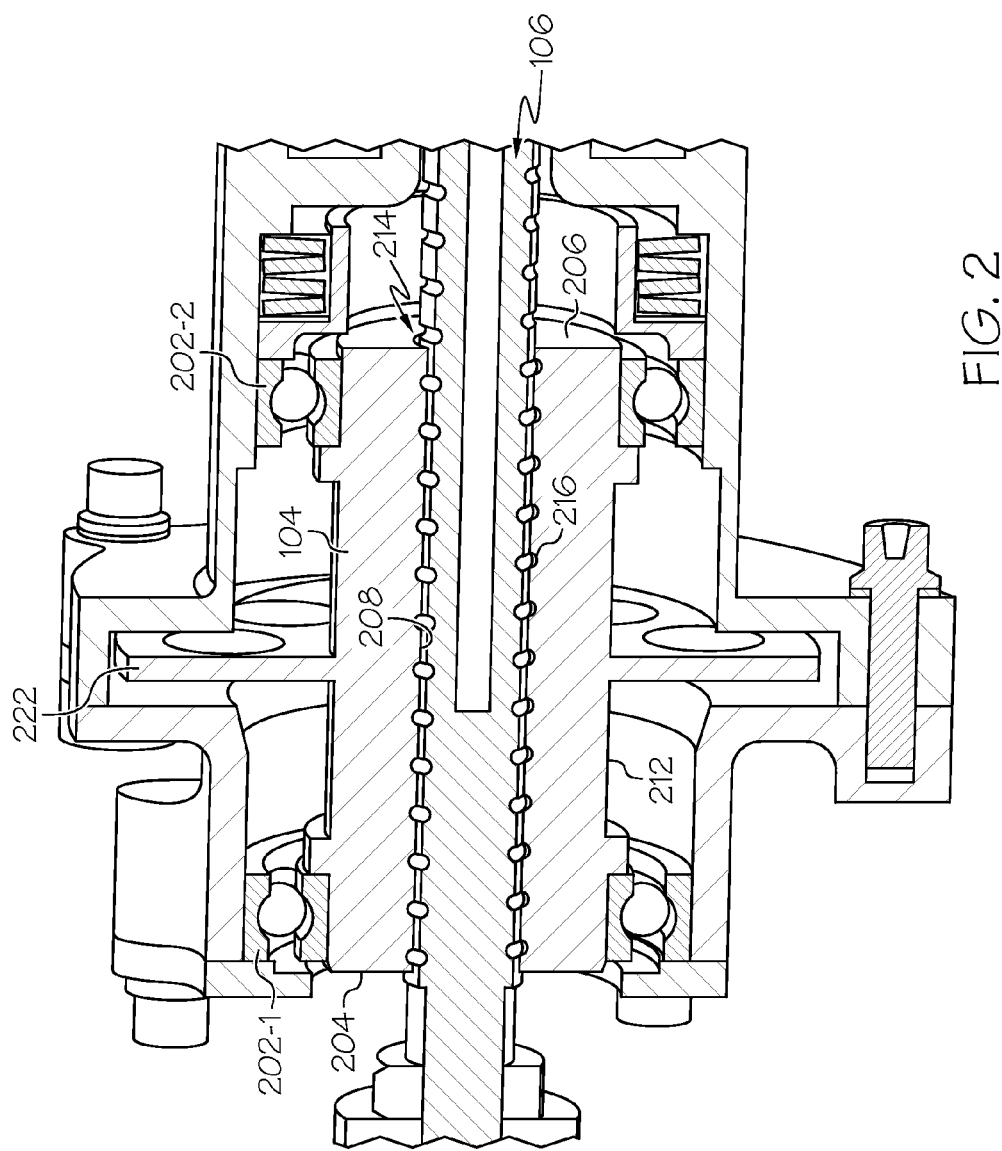
FIG. 2 depicts a close-up cross section view of a ball nut and a portion of a ball screw that may be used to implement the actuator assembly of FIG. 1.

Referring to FIGS. 1 and 2, an exemplary ball screw actuator 100 is depicted. The depicted actuator 100 is a linear electromechanical (EMA) actuator and includes a motor 102, a ball nut 104, and a ball screw 106, all disposed at least partially within or on an actuator housing 112. The motor 102, which is mounted on the housing 112, may be variously configured and implemented. For example, each motor 102 may be implemented using any one of numerous types of hydraulic motors, pneumatic motors, or electric motors. In the depicted embodiment, it is implemented using an electric motor, which may be any one of numerous types of electric motors, such as an AC motor, a brushed DC motor, or a brushless DC motor, just to name a few. No matter how the motor 102 is specifically implemented, it is coupled to the ball nut 104, preferably via a non-illustrated gear set, and is configured to selectively supply a drive torque to the ball nut 104. Although dual wound motor 102 is depicted in FIG. 1, it will be appreciated that the actuator 100 could be implemented with more than this number of motors.

Before proceeding further, it is noted that the depicted actuator 100 additionally includes a position sensor 103. The position sensor 103 is mounted on the aft end of the motor 102 and may be variously configured and implemented. In the depicted embodiment, however, the position sensor 103 is implemented using a dual resolver configured to provide output signals representative of actuator position.

The ball nut 104, which is shown more clearly in FIG. 2, is rotationally mounted in the housing 112, via a plurality of bearing assemblies 202 (202-1, 202-2). The ball nut 104 is coupled to receive the input torque supplied from the motor 102 and is configured, upon receipt thereof, to rotate and supply a drive force to the ball screw 106. The ball nut 104 may be variously configured and implemented, but includes at least a first end 204, a second end 206, an inner surface 208, and an outer surface 212. The ball nut inner surface 208 defines a passageway 214 that extends through the ball nut 104 between the first and second ends 204, 206, and has a plurality of helical ball grooves (or "threads") 216 formed thereon. The ball nut outer surface 212 has an input gear 222 coupled thereto and extending therefrom. The input gear 222 receives, via the non-illustrated gear set, the rotational drive torque supplied from the motor 102, which in turn causes the ball nut 104 to rotate and supply the drive force to the ball screw 106.

Figure 3:
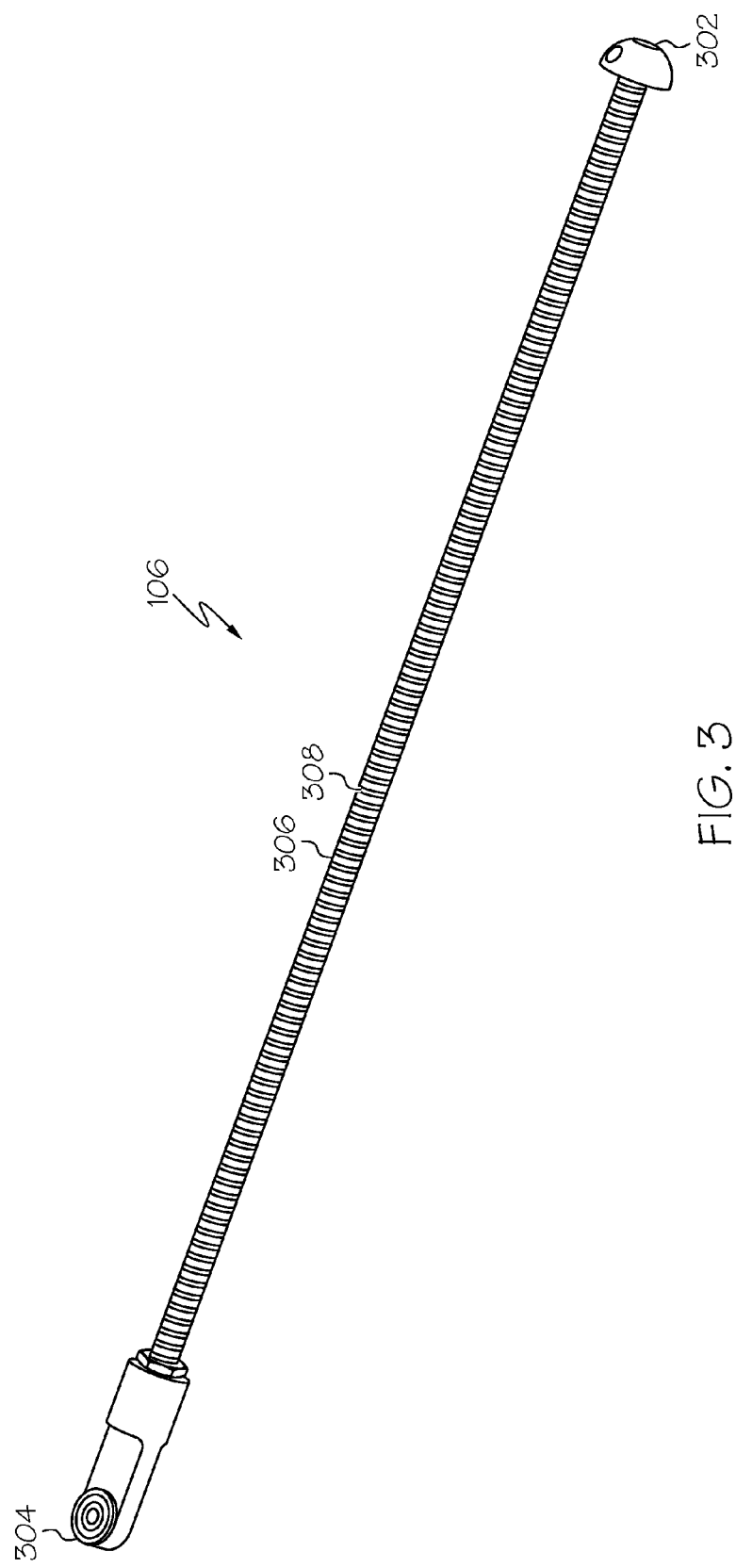
FIG. 3 depicts two different side views of a ball screw that may be used to implement the actuator of FIG. 1.

The ball screw 106 is mounted within the housing 112 and extends through the ball nut passageway 216. The ball screw 106 is configured, upon receipt of the drive force supplied thereto from the ball nut 104, to selectively translate between a retract position and a extend position. As illustrated most clearly in FIG. 3, the ball screw 106 includes a first end 302, a second end 304, and an outer surface 306. The ball screw outer surface 306 has a single or a plurality of ball grooves (or "threads") 308 formed thereon. A plurality of non-illustrated recirculating balls are disposed within the ball nut ball grooves 216, and in selected ones of the ball screw ball grooves 308. The balls, in combination with the ball grooves 216, 308, convert the rotational movement of the ball nut 104 into the translational movement of the ball screw 106. It will be appreciated that the direction in which the ball screw 106 travels will depend on the direction in which the ball nut 104 rotates.

Figure 4:
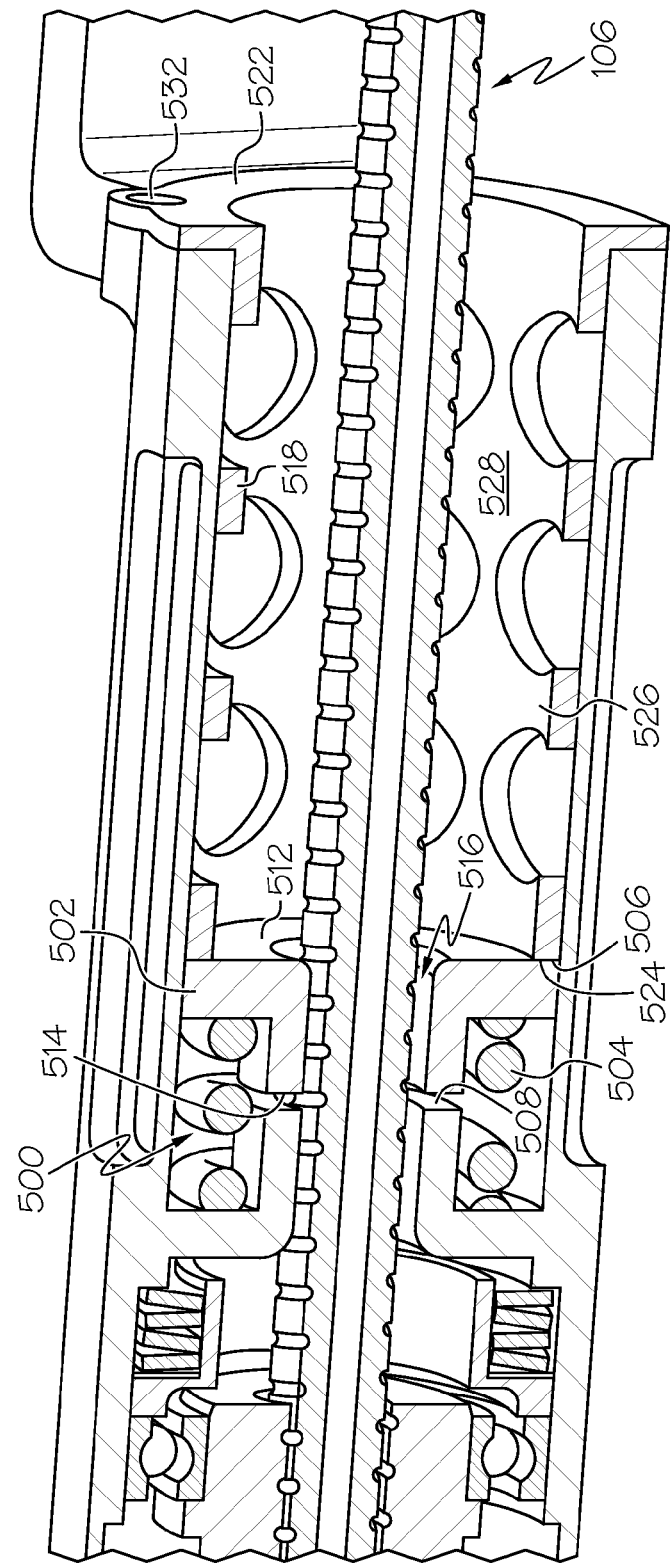
FIGS. 4 and 5 close-up cross section plan views of the ball screw actuator of FIG. 1 with an axial soft stop mounted thereon.
Figure 5:
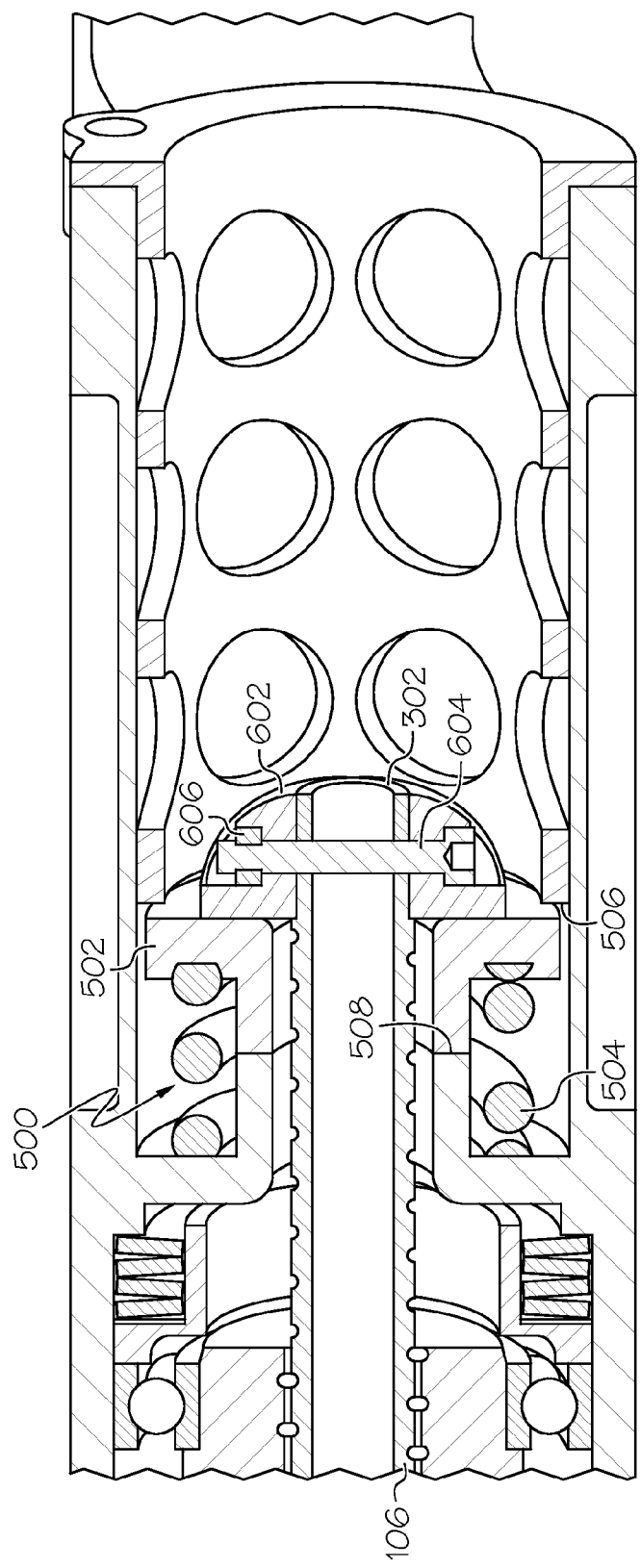

As FIGS. 4 and 5 further depict, an axial soft stop assembly 500 is disposed within the actuator housing 112. The axial soft stop 500 is configured to be selectively engaged by the ball screw 106 and, upon being engaged by the ball screw 106, to translate, with compliance, a predetermined distance in the extend direction. The axial soft stop 500 is additionally configured, upon translating the predetermined distance, to prevent further movement of the ball screw 106 in the extend direction.

It will be appreciated that the axial soft stop 500 may be variously configured to implement its functionality, but in the depicted embodiment the axial soft stop 500 includes an axial limiter 502, a spring 504, a first axial stop 506, and a second axial stop 508. The axial limiter 502 is movably disposed within the actuator housing 112 and is configured to selectively translate between a first position, which is the position depicted in FIG. 4, and a second position, which is the position depicted in FIG. 5. The axial limiter 502 may be variously implemented, but in the depicted embodiment it includes a first end 512, a second end 514, and an opening 516 extending between the first and second ends 512, 514.

The ball screw 106 extends through the opening 516 in the axial limiter 502 and, as shown more clearly in FIG. 5, additionally includes a stop member 602. The stop member 602 is coupled to and surrounds the first end 302 of the ball screw 106 and selectively engages the axial limiter 502 when the ball screw 106 is moved in the extend direction. Although the stop member 602 may be coupled to the ball screw 106 using any one of numerous techniques, in the depicted embodiment it is mounted on the ball screw 106 via a fastener 604 that extends through the stop member 602 and the ball screw 106, and is held in place via a nut 606.

The spring 504 is disposed within the actuator housing 112 and engages both the actuator housing 112 and the axial limiter 502. The spring 504 supplies a bias force to the axial limiter 502 that urges the axial limiter 502 toward the first position. It will be appreciated that the spring 504 may be variously implemented. In the depicted embodiment the spring 504 is implemented using a coil spring, but it may alternatively be implemented using, for example, a helical machine spring or a torsion spring, just to name a few non-limiting examples.

The first axial stop 506 and the second axial stop 508 are both coupled to and disposed within the actuator housing 112, and are spaced apart from each other by the previously mentioned predetermined distance. The axial limiter 502 is disposed between and selectively engages the first and second axial stops 506, 508, and is urged, by the spring 504, toward engagement with the first axial stop 506. More specifically, when the axial limiter 502 is in the first position, it engages the first axial stop 506, and when the axial limiter 502 is in the second position, it engages the second axial stop 508.

It will be appreciated that the first and second axial stops 506, 508 may be variously configured and implemented. In the depicted embodiment, however, the first axial stop 506 is defined by a sleeve 518 and the second axial stop 508 is formed integrally with the actuator housing 112. The sleeve 518 is coupled to and extends into the actuator housing 112, and includes first end 522, a second end 524, and an inner surface 526 that defines an opening 528 between the first and second ends 522, 524 and through which the ball screw 106 extends. The first end 522 is coupled to the actuator housing 112 via, for example, suitable hardware 532, and the second end 526 defines the first axial stop 506.

Figure 6:
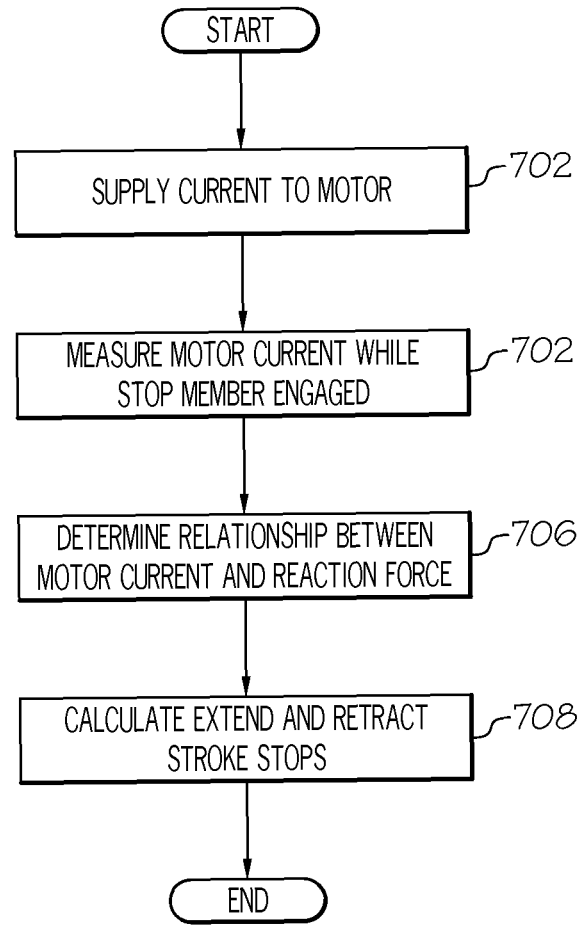
FIG. 6 depicts a process, in flowchart form, for determining a relationship between motor current and a known reaction force supplied from a spring member.

The axial soft stop 500 described herein allows the motor 102 to drive the ball screw 106 into the axial soft stop 500 so that a relationship between the motor current and the known reaction force supplied from the spring 504 can be determined. In particular, and as depicted in flowchart form in FIG. 6, current is supplied to the motor 102 so that the axial limiter 502 is engaged and displaced the predetermined distance (702). As a result, the spring 504 will supply a reaction force. By measuring the motor current while the axial limiter 502 is engaged (704), the relationship between motor current and reaction force can be determined (706). This indicates to the non-illustrated actuator controller that the ball screw 106 is in the extend position and, FIG. 6 also depicts, allows it to calculate the extend and retract stroke stops (708). Thus, the controller now knows actuator position. With the motor current relationship having been determined, the controller, on a subsequent power up, can establish the full extend position by driving the actuator to the extend position until a predetermined current level is achieved. The controller may then count resolver rotations to determine absolute position.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator, comprising:
    an actuator housing;
    a ball screw extending through the actuator housing and having a first end and a second end, the ball screw coupled to receive a drive force and configured, upon receipt of the drive force, to selectively move in a retract direction and an extend direction;
    a stop member coupled to and surrounding the first end of the ball screw;
    a sleeve coupled to and extending into the actuator housing, the sleeve having a first end, a second end, and an inner surface that defines an opening between the first and second ends and through which the ball screw extends, the first end coupled to the actuator housing, the second end defining a first axial stop;
    a second axial stop coupled to and disposed within the actuator housing, the second axial stop spaced apart from the first axial stop by a predetermined distance; and
    an axial soft stop assembly disposed within the actuator housing, the axial soft stop assembly configured to be selectively engaged by the stop member and, upon being engaged thereby, to translate, with compliance, the predetermined distance in the extend direction, and to prevent further movement of the ball screw upon translating the predetermined distance,
    wherein the axial soft stop assembly comprises:
        an axial limiter movably disposed within the actuator housing and having an opening through which the ball screw extends, the axial limiter configured to selectively translate between a first position, in which it engages the first axial stop, and a second position, in which it engages the second axial stop, and
        a spring disposed within the actuator housing, the spring surrounding a portion of and engaging the axial limiter, the spring supplying a bias force to the axial limiter that urges the axial limiter toward the first position,
    wherein the stop member is configured to selectively engage the axial limiter when the ball screw is moved in the extend direction.

2. The actuator of claim 1, further comprising:
    a ball nut rotationally mounted within the housing and having an opening through which the ball screw extends, the ball nut adapted to receive an input torque and configured, upon receipt thereof, to rotate and supply the drive force to the ball screw.

3. The actuator of claim 1, wherein the spring is selected from the group consisting of a helical machine spring, a torsion spring, and a coil spring.

4. The actuator of claim 1, wherein the second axial stop is formed integrally with the actuator housing.

5. The actuator of claim 1, further comprising:
    a motor coupled to the ball nut and configured to selectively supply the drive torque thereto.

6. The actuator of claim 5, further comprising:
    a gear set coupled between the motor and the ball nut.

7. An actuator, comprising:
    an actuator housing;

a ball nut rotationally mounted within the housing and coupled to receive an input torque, the ball nut configured, upon receipt of the input torque, to rotate and supply a drive force;

a motor mounted on the actuator housing and coupled to the ball nut, the motor configured to selectively supply the drive torque to the ball nut;

a ball screw extending through the actuator housing and the ball nut, and having a first end and a second end, the ball screw coupled to receive the drive force from the ball nut and configured, upon receipt of the drive force, to selectively move in a retract direction and an extend direction;

a stop member coupled to and surrounding the first end of the ball screw;

a sleeve coupled to and extending into the actuator housing, the sleeve having a first end, a second end, and an inner surface that defines an opening between the first and second ends and through which the ball screw extends, the first end coupled to the actuator housing, the second end defining a first axial stop;

a second axial stop coupled to and disposed within the actuator housing, the second axial stop spaced apart from the first axial stop by a predetermined distance; and an axial soft stop assembly disposed within the actuator housing, the axial soft stop assembly configured to be selectively engaged by the stop member and, upon being engaged thereby, to translate, with compliance, the predetermined distance in the extend direction, and to prevent further movement of the ball screw upon translating the predetermined distance, wherein the axial soft stop assembly comprises:

an axial limiter movably disposed within the actuator housing and having an opening through which the ball screw extends, the axial limiter configured to selectively translate between a first position, in which it engages the first axial stop, and a second position, in which it engages the second axial stop, and a spring disposed within the actuator housing, the spring surrounding a portion of and engaging the axial limiter, the spring supplying a bias force to the axial limiter that urges the axial limiter toward the first position, wherein the stop member is configured to selectively engage the axial limiter when the ball screw is moved in the extend direction.

8. The actuator of claim 7, wherein the spring is selected from the group consisting of a helical machine spring, a torsion spring, and a coil spring.

9. The actuator of claim 7, wherein the second axial stop is formed integrally with the actuator housing.

10. The actuator of claim 7, further comprising:

a gear set coupled between the motor and the ball nut.

* * * * *